I. F. GILES.
DEVICE FOR MEASURING DRY MATERIALS.
APPLICATION FILED MAR. 11, 1914.
1,189,248.
Patented July 4, 1916.
5 SHEETS—SHEET 1.
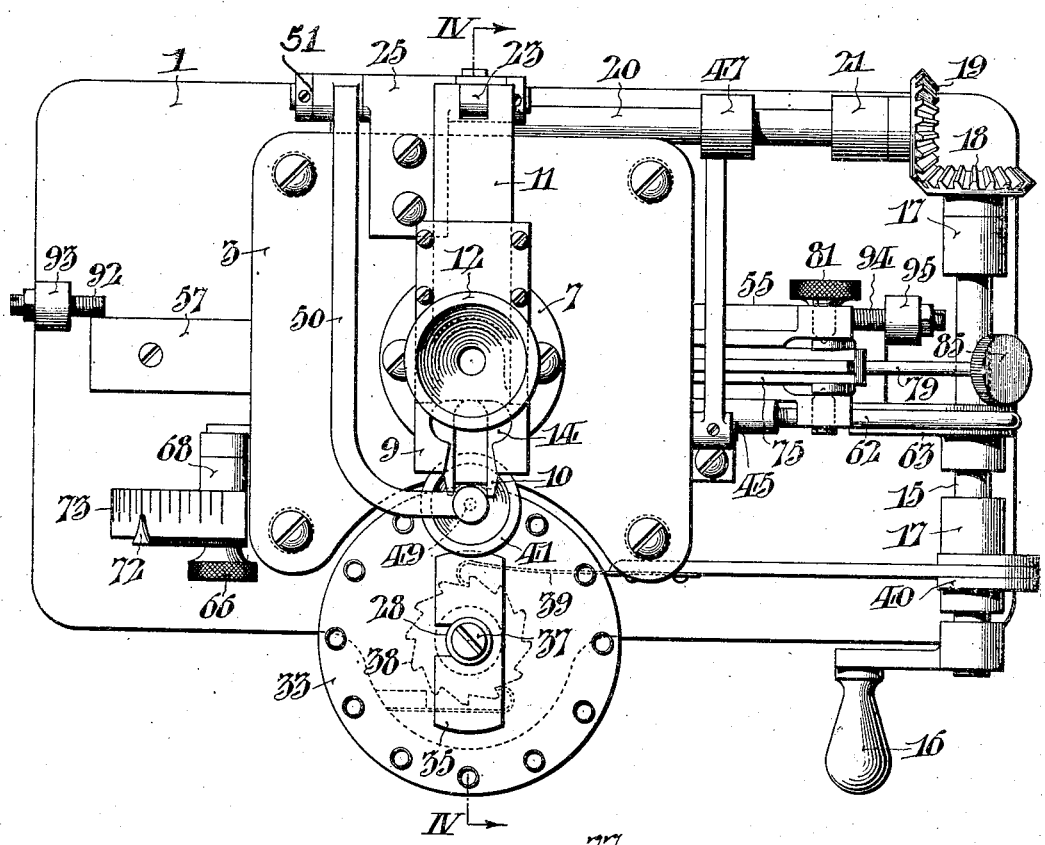
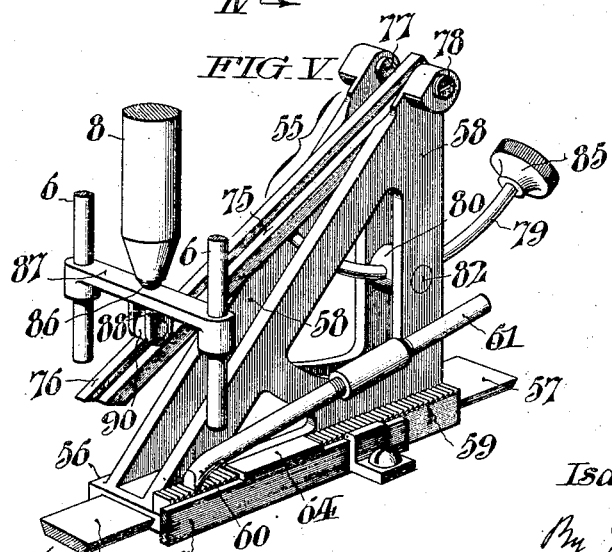

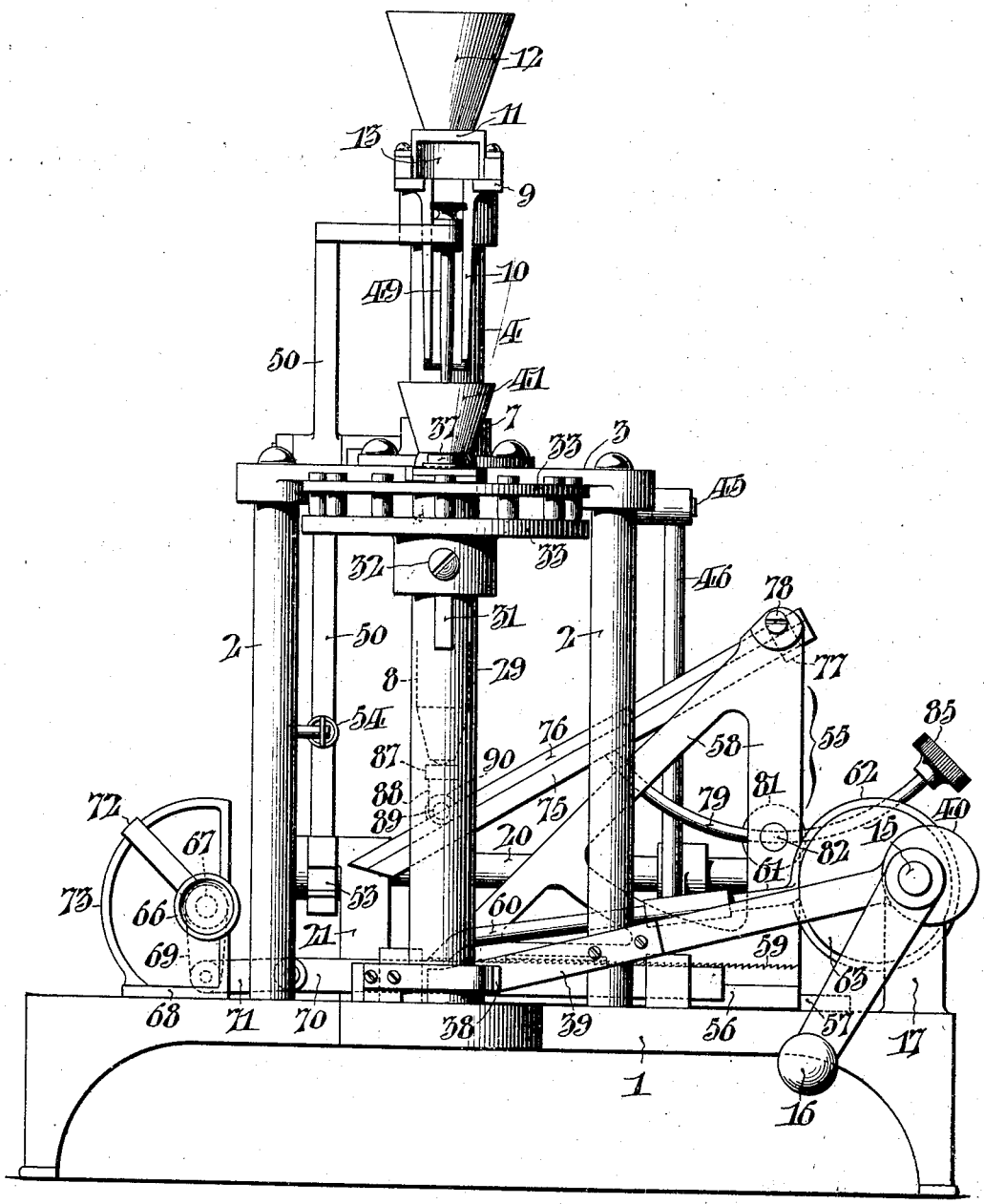

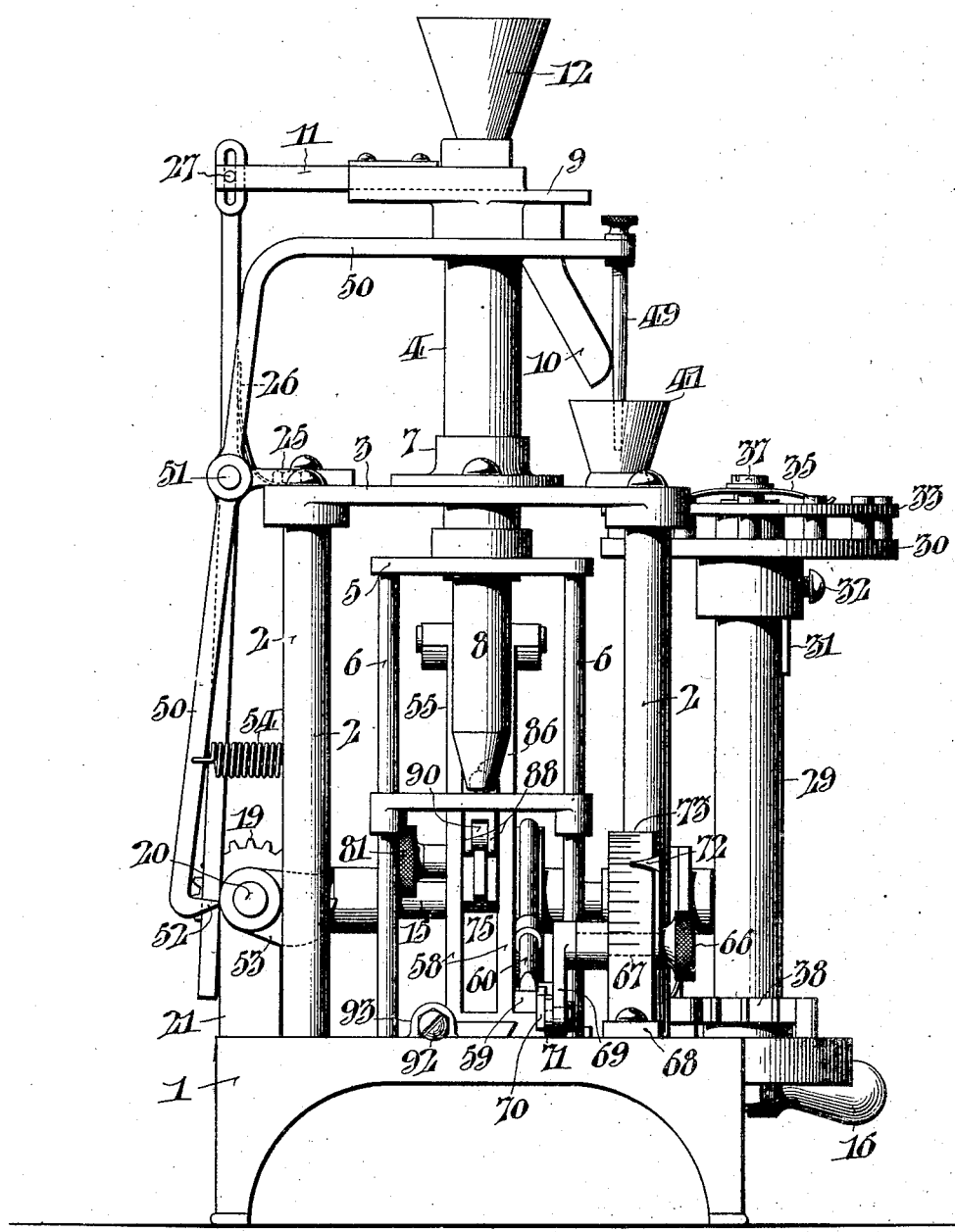

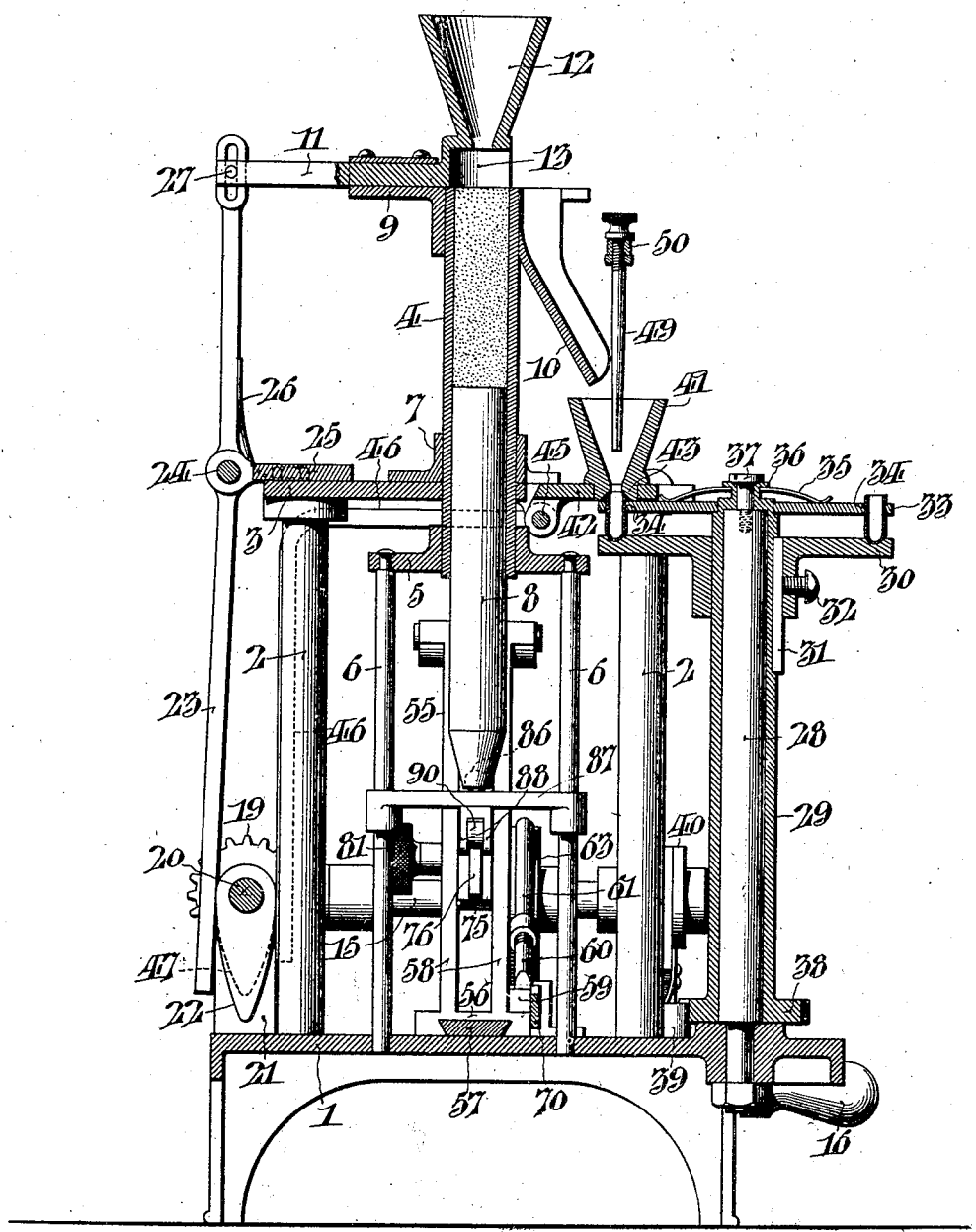

I. F. GILES.
DEVICE FOR MEASURING DRY MATERIALS.
APPLICATION FILED MAR. 11, 1914.
1,189,248.
Patented July 4, 1916.
5 SHEETS—SHEET 5.
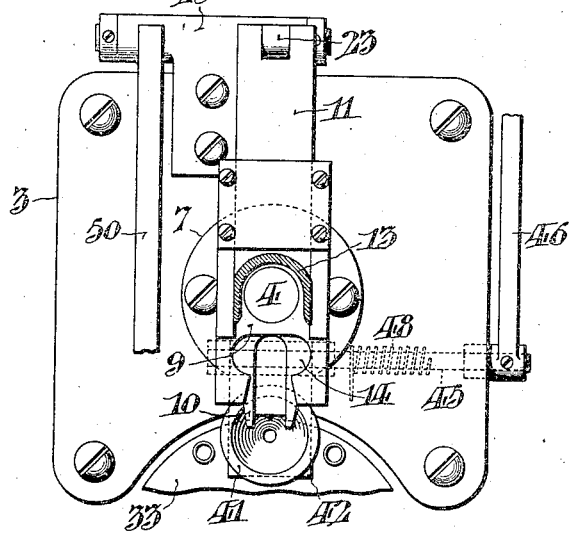
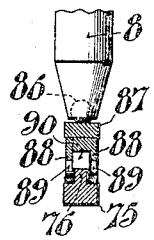
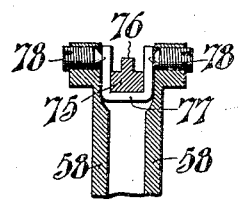
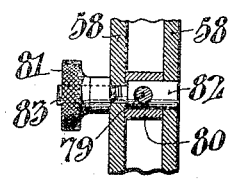
Inventor
Isaac F. Giles,
Witnesses
Attorneys

UNITED STATES PATENT OFFICE.

ISAAC F. GILES, OF TRENTON, NEW JERSEY.

DEVICE FOR MEASURING DRY MATERIALS.

1,189,248.  Specification of Letters Patent.  Patented July 4, 1916.

Application filed March 11, 1914. Serial No. 823,895.

*To all whom it may concern:*

Be it known that I, ISAAC F. GILES, of Trenton, in the county of Mercer and State of New Jersey, have invented certain new and useful Improvements in Devices for Measuring Dry Materials, whereof the following is a specification, reference being had to the accompanying drawings.

The invention relates more particularly to devices for filling capsules or the like.

The primary object of my invention is to provide a measuring device whereby a predetermined weighed quantity of dry material, such as powdered chemicals, etc., may be equally divided as a whole, into a predetermined number of subdivisions.

A further object of the invention is to provide a measuring device for removing successively from a supply magazine equal amounts of dry material by the aid of a reciprocating member, which is moved forward step by step by a traveling carriage moving in a path at right angles to the path of said reciprocating member, and provided with devices for imparting equal increments of movement to said reciprocating member.

A further object of the invention is to provide a device of the above character, with means whereby the increments of movement imparted to the reciprocating member may be varied.

A further object of the invention is to provide a device of the above character, with means whereby the length of the step movement given to the carriage may be varied.

A still further object of the invention is to provide a measuring device of the above character, with a capsule carrier and devices for transferring the measured amount of material to the capsule.

A still further object of the invention is to provide a capsule filling machine of the above character, with devices for contracting the upper or open end of the capsule to facilitate the closing of the same.

These and other objects will in part be obvious, and will in part be hereinafter more fully disclosed.

In the drawings which show by way of illustration one embodiment of the invention, Figure I, is a plan view of the capsule filling machine embodying my improvement. Fig. II, is a front view of the same. Fig. III, is an end view of the same, looking from the left of Fig. II. Fig. IV, is a vertical sectional view on the line IV—IV of Fig. I. Fig. V, is a detail in perspective, showing the traveling carriage and the devices for imparting movement to the reciprocating member. Fig. VI, is a top plan view of a portion of the machine with the receiving hopper cut away and showing the devices for transferring the measured amounts of material to the funnel, which directs the same to the capsule. Fig. VII, is a detail partly in section, showing the members directly engaging the plunger for reciprocating the same. Fig. VIII, is a detail in perspective, showing the shoe which is carried by the lower end of the reciprocating head which moves the plunger, the shoe being inverted in this view. Fig. IX, is a detail in section, showing the connection of the actuating bar to the traveling carriage. Fig. X, is a detail in section, showing the means for holding said actuating bar in adjusted position.

The invention consists generally in providing a magazine in which a predetermined amount of bulk of the material is placed and this magazine is formed with a vertically reciprocating plunger which serves as a movable bottom therefor. The plunger is raised by devices which impart equal increments of movement thereto, whereby equal measured amounts of material are raised above the top of the magazine. A reciprocating ejector removes the portion of the material above the top of the magazine and transfers the same to a chute which leads to a funnel located above the capsule carrying member. This capsule carrying member is intermittently rotated so as to bring the capsules successively under the funnel. The funnel is slightly raised so as to permit the positioning of the capsules, after which the funnel descends over the top of the capsules. Said funnel is so shaped as to slightly contract the top of the capsules and directs the filling material into the capsules. The plunger is raised by a traveling carriage which moves in a direction substantially at right angles to the path of movement of the plunger, and this carriage is provided with a bar arranged at an inclination to the path of travel of the carriage. The bar engages a reciprocating head which in turn engages the plunger. Said bar has sliding contact with the reciprocating head and may be adjusted so as to vary its angle according to the amount of material within the magazine. The carriage is moved step by step and devices are provided for varying the length of the step movement given to the carriage.

Referring more in detail to the drawings, my improved measuring apparatus consists of a bed plate 1, having standards 2, which support a table 3. Mounted on the table 3, is a magazine 4. This magazine, as herein shown, is cylindrical in cross-section and extends through the table 3. A bracket 5, is secured to the lower end of the magazine and this bracket supports the upper ends of the parallel rods 6, 6, which are also secured in the bed plate 1. A collar 7, serves to secure the magazine rigidly to the table 3. The magazine 4, is open at its upper end and a plunger 8, extends up into the same, and serves as a movable bottom therefor. The plunger 8, is raised by successive increments of movement by mechanism to be described later. The magazine is filled with a predetermined amount of the material which is to be divided and as the plunger is raised a measured amount of material will be raised above the top of the magazine. The magazine carries a laterally projecting shelf 9, at its upper end and this shelf is supplemented with a downwardly inclined chute 10. A reciprocating ejector 11, is slidably mounted on the shelf 9, and is adapted to move horizontally across the top of the magazine. When a measured amount of material is raised above the top of the magazine, the ejector as it moves forward will remove this measured amount and discharge the same into the chute 10. A funnel 12, is attached to the ejector 11, and is for the purpose of guiding the dry material into the magazine. The ejector 11, is formed with a U-shaped inner end 13, see Fig. VI, which partly surrounds the opening at the top of the magazine. The chute 10, is slightly enlarged at its top as indicated at 14, see Fig. VI, so as to aid in receiving all the material moved forward by the ejector.

Mounted on the bed plate 1, is a main operating shaft 15, which is rotated, as herein shown, by a crank handle 16. This shaft is journaled in suitable bearings 17. A beveled gear 18, meshes with a beveled gear 19, on a cross shaft 20, which is mounted in suitable bearings 21. A cam 22, is carried by the cross shaft 20, and this cam operates upon a lever 23, pivoted at 24, to a bracket 25, carried by the table 3. The lever 23, is maintained in engagement with cam 22, by means of a leaf spring 26, attached to the top of table 3. The upper end of the lever 23, is formed with a slot, which engages a pin 27, on the outer end of the ejector 11. As the shaft 20, rotates, the lever 23, will be oscillated, which will in turn reciprocate the ejector. At the front of the machine, there is a capsule carrier consisting of a fixed vertical rod 28, on which is mounted a rotatable sleeve 29. This sleeve at its upper end carries a disk 30, which is connected thereto by a key 31. Said disk 30, is adjustable vertically by means of a set screw 32, to accommodate capsules of various sizes. The disk 30, is provided with sockets adapted to receive the lower ends of the capsules. A second spaced disk 33, is attached to the upper end of the sleeve 29, and is provided with openings 34, which are in alinement with the sockets in disk 30. The disk 33, is removably attached to the upper end of the sleeve 29, and a leaf spring 35, bears against the disk and holds it in place. This spring abuts against a shoulder 36, at the top of sleeve 29. A shouldered screw 37, passes through the upper end of the sleeve 29, into the supporting rod 28, and holds the sleeve in place thereon. The lower end of the sleeve 29, carries a ratchet wheel 38. A pawl 39, operates the ratchet 38, and is reciprocated from the main shaft 15, by an eccentric 40, and will thus impart an intermittent movement to the capsule carrier.

A funnel 41, overhangs the disk 33, and is carried by a swinging bracket 42. This funnel has a cone-shaped recess 43, at its lower end. The bracket 42, is adapted to be raised, lifting the funnel to permit the capsules to be swung into place underneath the same. The disk 30, is preferably so adjusted that the capsule projects slightly above said disk 33. When the capsule is in place, the funnel is lowered over the upper end thereof and the cone-shaped recess engages the capsule contracting its open end, which facilitates the placing of the cap on the capsule. The bracket 42, is fixed to a shaft 45, which carries an arm 46, which projects rearwardly and thence downwardly, see Figs. IV and VI. This downward projecting arm 46, is acted upon by a cam 47, fixed to the shaft 20, as shown in dotted lines in Fig. IV. A coiled spring 48, keeps arm 46, in engagement with its cam 47 (Fig. VI). As the shaft 20 rotates the cam 47, will intermittently raise the funnel to permit the movement of the capsules underneath the same. This funnel 41, is so positioned that the material is fed into the same from the chute 10.

A packing rod 49, is carried by an arm 50, and extends into the funnel 41, (see Fig. III). The arm 50, is fulcrumed at 51, to the bracket 25. The arm projects downwardly below the fulcrum 51, and is provided with a finger 52, which lies in the path of a toothed cam 53, mounted on the shaft 20. A spring 54, forces the finger 52, into engagement with cam 53. As this cam rotates, the finger 52, will be raised by these teeth or projections and drop off the same, under the action of spring 54, and this will impart an oscillating or vibrating movement to the arm 50, which will in turn vibrate the rod 49, in the funnel 41. This serves to stir and loosen the material, in the funnel and also packs the material into the capsule.

The plunger 8, is raised by a traveling carriage 55. This carriage is formed with a supporting plate 56, which has a dovetailed connection with a guide rail 57. The carriage comprises spaced uprights 58, which are rigidly attached to the supporting plate 56. A rack 59, is attached to the supporting plate 56, and is adapted to coöperate with a pawl 60. The pawl 60, is carried at the end of a rod 61, which is formed integral with a strap 62, coöperating with an eccentric 63, on the main shaft 15. As the main shaft 15, rotates, the pawl will be reciprocated horizontally to move the carriage 55. A pawl guard 64, overlaps the rack 59, and serves to limit the movement imparted to the rack through the reciprocating pawl 60, which owing to the eccentric connection has a fixed throw. In other words, this pawl guard is so positioned that when the pawl 60, is reciprocated, it will be drawn up on the pawl guard, so that only a portion of its movement is imparted to the rack 59. When the pawl moves forward, it slips off the pawl guard, engages a tooth in the rack 59, and moves the rack until it reaches the forward end of its stroke. In order to vary the effective movement of the pawl 60, with relation to the carriage 55, the position of the pawl guard 64, may be adjusted by means of a thumb knob 66. This knob is secured to a stud shaft 67, carried by a bracket 68. To the other end of shaft 67, is secured an arm 69, which is pivotally connected with the slide 70, carrying the pawl guard 64, by means of a link 71. It will thus be seen that the position of the guard may be adjusted by the manipulation of the knob 66. The adjustment of the guard is recorded by means of a pointer 72, coöperating with a graduated sector 73, formed integral with bracket 68. The graduations on the sector may be such as to indicate various equal subdivisions of the contents of the magazine, as will be more specifically described later. The carriage 55, is provided with an actuating bar 75, having a central rib 76. Said bar is rigidly attached to a U-shaped bracket 77, which is mounted on pivot screws 78, carried by the uprights of the carriage, see Fig. IX. A curved rod 79, is fixed to the actuating bar 75, and extends through a collar 80, supported between the uprights of the carriage (see Fig. X). The collar 80, serves as a spacer for the side frames 58, of the carriage 55, and surrounds a pin 82, provided with a reduced threaded portion 83, which is engaged by a thumb nut 81. The curved rod 79, extends through an enlarged aperture in the pin 82, so as to permit free movement of the actuating bar while adjusting the same. When the nut 81, is tightened, the pin 82, will be drawn toward the nut 81, thereby effectively clamping the rod 79, and preventing any accidental displacement of the same after the actuating bar has been set. The outer end of the rod 79, is formed with a suitable thumb knob 85.

The lower end of the plunger 8, is provided with a ball stud 86, which rests on a cross head 87, slidingly mounted on the vertical guide rods 6. In order that the plunger 8, may be caused to move vertically in equal increments by the cross head 87, corresponding with those of the carriage 55, regardless of the inclination of the actuating bar 75, I have provided a combined pivotal and sliding connection with the latter in the form of a shoe 90, (Fig. VIII) having trunnions 89, mounted in lugs 88, depending from the cross head 87. The shoe 90, is provided with a flat face 91, which is in a common plane with the longitudinal center of the trunnions 89, and is adapted to slide upon the upper face of the rib 76, formed on the actuating bar 75. The flat face 91, of shoe 90, will automatically adjust itself to any angular position of the actuating bar. It will be noted that the longitudinal center of the trunnions 89, will always slide in the plane of the upper face of the rib 76, of bar 75, and that by this construction the distance between the center of the trunnions and the top of the plunger 8, is a fixed dimension, regardless of the position or angularity of the bar 75, so that equal increments of movement of the carriage will at all times cause equal increments of movement in the plunger, in proportion to the angle of the bar 75, which may vary according to the quantity of the initial charge in the magazine, as will be more specifically described later.

A stop screw 92, is adjustably mounted in a lug 93, on the bed plate 1. A similar stop screw 94, is mounted in a lug 95, carried by the bed plate at the other end of the path of travel of the carriage. These stop screws limit the movement of the carriage and consequently limit the movement of the plunger, so that its range of movement is from the lower end of the magazine to the upper end thereof.

In the operation of my device, the carriage is first moved to the right (Fig. II) until engaged by the set screw 94. The actuating rod 75, is then moved down into coincidence with the angle of the side frames of the carriage so that the top of the plunger 8, may drop to the very bottom of the magazine. A predetermined amount of the material to be divided is then placed into the magazine. The actuating bar 75, is then adjusted by means of the thumb knob 85, until the top of the powder in the magazine is flush with the upper surface of the shelf 9, whereupon the bar 75, is clamped into position by means of the thumb nut 81.

In order to divide the predetermined weighed quantity of powder to fill a given number of capsules, the pawl guard is adjusted by means of the thumb knob in accordance with the graduation on the sector corresponding to the integer for the number of divisions desired. The capsules are then placed in the capsule carrier and a rotating of the main shaft will cause the ejector to move across the top of the magazine, carrying with it a measured amount of material which is delivered into the chute, and from the chute into the funnel and thence to the capsule. The next rotation of the main shaft through the cams on the cross shaft 20, will raise the funnel, move the capsule carrier so as to bring a new capsule into position under the funnel, and then lower the funnel on to the capsule. This same movement of the main shaft will give the plunger its next upward increment of movement, thus raising another equal measured amount of material above the top of the magazine, which material, as before, is removed by the ejector and delivered to a capsule.

The angle of the actuating bar being fixed, will cause the plunger to be moved equal increments corresponding in proportion to the increments of the carriage 55, under the influence of pawl 60, whose effective movements are also fixed by the adjustment of the pawl guard 64. It will thus be seen that the contents of the magazine will be equally divided until exhausted. The set screw 92, which limits the movement of the carriage to the left, Figs. I and II, is so adjusted that when the said carriage engages the same, the top of the plunger 8, will be flush with the surface of the shelf 9, so that all the material in the magazine will be delivered in equal divisions.

While I have described my device as measuring dry materials and delivering the same to capsules, it will be understood that the measured amounts may be otherwise used. It will also be understood that my capsule filling device may be used in connection with automatic mechanism for handling the capsules. It will also be understood that various changes in the details of construction and arrangement of parts may be made without departing from the spirit of the invention as set forth in the appended claims.

Having thus described my invention, I claim:

1. A measuring apparatus comprising a supply magazine, the capacity of which is capable of being adjusted to exactly hold a predetermined or weighed quantity of material, in combination with means for successively subdividing the contents of the magazine into a predetermined number of equal portions.

2. A measuring apparatus comprising a supply magazine, a plunger forming the bottom of the said magazine, means for adjusting the said plunger to vary the capacity of the said magazine, to exactly hold a predetermined or weighed quantity of material, and means for dividing the contents of the said magazine into a predetermined number of equal subdivisions after the adjustment of the said plunger.

3. A measuring apparatus comprising a supply magazine and mechanism for removing therefrom successively equal amounts of material, including a reciprocating member, a carriage movable substantially at right angles to the path of reciprocation of said member, means for moving said carriage step by step, and devices mounted on said carriage for engaging said reciprocating member for giving thereto equal increments of movement for each step movement of the carriage.

4. A measuring apparatus comprising a supply magazine and mechanism for removing therefrom successively equal amounts of material, including a reciprocating member, a carriage movable substantially at right angles to the path of reciprocation of said member, means for moving said carriage step by step, devices mounted on said carriage for engaging said reciprocating member for giving thereto equal increments of movement for each step movement of the carriage, and means whereby the step by step movement given by the carriage may be varied.

5. A measuring apparatus comprising a supply magazine and mechanism for removing therefrom successively equal amounts of material, including a reciprocating carriage movable subsequently at right angles to said reciprocating member, means for moving the carriage step by step, an actuating bar mounted on said carriage at an inclination to the path of travel of the carriage, and devices for slidingly connecting said reciprocating member to said actuating bar.

6. A measuring apparatus comprising a supply magazine and mechanism for removing therefrom successively equal amounts of material, including a reciprocating carriage movable substantially at right angles to said reciprocating member, means for moving the carriage step by step, an actuating bar mounted on said carriage at an inclination to the path of travel of the carriage, devices for slidingly connecting said reciprocating member to said actuating bar, and means for varying the angle of inclination of said actuating bar.

7. A measuring apparatus comprising a supply magazine and mechanism for removing therefrom successively equal amounts of material, including a reciprocating carriage movable substantially at right angles to said reciprocating member, means for moving the carriage step by step, an actuating bar mounted on said carriage at an inclination to the path of travel of the carriage, devices for slidingly connecting said reciprocating member to said actuating bar, means for varying the angle of inclination of said actuating bar, and means for varying the step by step movement given to the carriage.

8. A measuring apparatus comprising a supporting bed, a cylindrical magazine mounted in a vertical position on said bed, a plunger adapted to reciprocate in said magazine and forming the bottom thereof, an ejector movable across the top of said magazine for removing a measured quantity of material raised above the top of the magazine, means for raising said plunger step by step, and means for varying the length of the step movement given to the said plunger.

9. A measuring apparatus comprising a supporting bed, a cylindrical magazine mounted in a vertical position on said bed, a plunger adapted to reciprocate in said magazine and forming the bottom thereof, an ejector movable across the top of said magazine for removing a measured quantity of material, raised above the top of the magazine, means for raising said plunger step by step, including a carriage movable in a direction substantially at right angles to the path of movement of said plunger, devices for moving said carriage step by step, and an actuating bar mounted on said carriage and adapted to slidingly engage said plunger.

10. A measuring apparatus comprising a supporting bed, a cylindrical magazine mounted in a vertical position on said bed, a plunger adapted to reciprocate in said magazine and forming the bottom thereof, an ejector movable across the top of said magazine for removing a measured quantity of material raised above the top of the magazine, means for raising said plunger step by step, including a carriage movable in a direction substantially at right angles to the path of movement of said plunger, devices for moving said carriage step by step, an actuating bar mounted on said carriage and adapted to slidingly engage said plunger, and means for varying the angle of inclination of said actuating bar for varying the capacity of the magazine to accommodate a predetermined or weighed quantity of material.

11. A measuring apparatus comprising a supporting bed, a cylindrical magazine mounted in a vertical position on said bed, a plunger adapted to reciprocate in said magazine and forming the bottom thereof, an ejector movable across the top of said magazine for removing a measured quantity of material raised above the top of the magazine, a cross head connected to said plunger, means for guiding said cross head, a carriage movable substantially at right angles to the path of travel of said plunger, means for moving said carriage step by step, an actuating bar mounted on said carriage at an inclination to the path of travel thereof, a connecting block adapted to slidingly engage said actuating bar and having trunnions adapted to engage depending lugs mounted on said cross head.

12. A measuring apparatus comprising a supporting bed, a cylindrical magazine mounted in a vertical position on said bed, a plunger adapted to reciprocate in said magazine and forming the bottom thereof, an ejector movable across the top of said magazine for removing a measured quantity of material raised above the top of the magazine, a cross head connected to said plunger, means for guiding said cross head, a carriage movable substantially at right angles to the path of travel of said plunger, means for moving the carriage step by step, an actuating bar mounted on said carriage at an inclination to the path of travel thereof, a connecting block adapted to slidingly engage said actuating bar and having trunnions adapted to engage depending lugs mounted on said cross head, and means for varying the angle of inclination of said actuating bar for varying the capacity of the magazine to accommodate a predetermined or weighed quantity of material.

13. A measuring apparatus comprising a vertical magazine, a reciprocating plunger forming the bottom of said magazine, an angular adjustable actuating bar for raising said plunger, a carriage supporting the said actuating bar; means for moving said carriage step by step in a direction substantially at right angles to the direction of reciprocation of the said plunger, a combined sliding and pivotal connection between the said actuating bar and the supporting crosshead for the plunger including a shoe pivotally connected to the said crosshead and having a flat face in a common plane with its pivotal support, said flat face being adapted to slidably engage the actuating bar and automatically adjust itself to the various angular positions of the said actuating bar, substantially as set forth.

14. A measuring apparatus comprising a vertical magazine, a reciprocating plunger forming the bottom of the said magazine, an angularly adjustable actuating bar for raising said plunger, a combined pivotal and sliding connection between the said plunger and actuating bar, a carriage for said actuating bar, a toothed rack on said carriage, a coöperating reciprocating pawl adapted to impart a step by step movement to the said carriage, and means for varying the effective throw of said pawl with respect to the said carriage.

15. A measuring apparatus comprising a vertical magazine, a reciprocating plunger forming the bottom of the said magazine, an angularly adjustable actuating bar for raising said plunger, a combined pivoted and sliding connection between the said plunger and actuating bar, a carriage for said actuating bar, a toothed rack on said carriage, a coöperating reciprocating pawl adapted to impart a step by step movement to the said carriage, and means for varying the effective throw of said pawl with respect to the said carriage, including a pawl guard slidably mounted above said rack in the path of the said pawl, and means for adjusting the position of the said pawl guard.

16. A measuring apparatus comprising a supply magazine the capacity of which is capable of being adjusted to exactly hold a predetermined or weighed quantity of material, means for raising a measured quantity of material above the top of the magazine and means for removing said measured quantity of material and directing the same to a capsule.

In testimony whereof, I have hereunto signed my name at Philadelphia, Pennsylvania, this sixth day of March, 1914.

ISAAC F. GILES.

Witnesses:
JAMES H. BELL,
E. L. FULLERTON.

Copies of this patent may be obtained for five cents each, by addressing the "Commissioner of Patents, Washington, D. C."